(12) United States Patent
Chakrabarty et al.

(10) Patent No.: US 12,450,166 B2
(45) Date of Patent: Oct. 21, 2025

(54) CACHING HOST MEMORY ADDRESS TRANSLATION DATA IN A MEMORY SUB-SYSTEM

(71) Applicant: Micron Technology, Inc., Boise, ID (US)

(72) Inventors: Sumangal Chakrabarty, Campbell, CA (US); Prateek Sharma, San Jose, CA (US); Raja V. S. Halaharivi, Gilroy, CA (US); Yoav Weinberg, Toronto (CA); Di Hsien Ngu, Zhubei (TW)

(73) Assignee: Micron Technology, Inc., Boise, ID (US)

( * ) Notice: Subject to any disclaimer, the term of this patent is extended or adjusted under 35 U.S.C. 154(b) by 90 days.

(21) Appl. No.: 18/483,790

(22) Filed: Oct. 10, 2023

(65) Prior Publication Data

US 2024/0143515 A1 May 2, 2024

Related U.S. Application Data

(60) Provisional application No. 63/421,659, filed on Nov. 2, 2022.

(51) Int. Cl.
*G06F 12/1081* (2016.01)
*G06F 13/30* (2006.01)

(52) U.S. Cl.
CPC .......... *G06F 12/1081* (2013.01); *G06F 13/30* (2013.01); *G06F 2212/6022* (2013.01); *G06F 2212/657* (2013.01)

(58) Field of Classification Search
CPC .. G06F 12/1081; G06F 12/1027; G06F 13/30; G06F 2212/6022; G06F 2212/657; G06F 2212/1024
See application file for complete search history.

(56) References Cited

U.S. PATENT DOCUMENTS

| | | | |
|---|---|---|---|
| 2009/0119663 A1* | 5/2009 | Mukherjee | G06F 12/1081 718/1 |
| 2019/0384722 A1* | 12/2019 | Basu | G06F 11/3471 |
| 2023/0281133 A1* | 9/2023 | Montero | G06F 12/1491 711/6 |
| 2024/0118913 A1* | 4/2024 | Guo | G06F 12/1027 |

* cited by examiner

*Primary Examiner* — Curtis James Kortman
(74) *Attorney, Agent, or Firm* — Lowenstein Sandler LLP

(57) ABSTRACT

A system includes host interface circuitry to interact with a host system and that includes an address translation circuit, which includes request staging queues to buffer the address translation requests, each includes a virtual address and received from a host interface circuit. Pending response queues buffer respective address translation requests that are waiting for an address translation from the host system while maintaining an order as received within the request stage queues. Reordering buffers reorder address translations, which are to be supplied to the host interface circuits, according to the order maintained within the pending response queues, each address translation includes a physical address mapped to the virtual address of a corresponding address translation request. A cache stores multiple of the address translations, associated with the address translation requests, for future access by the host interface circuits.

21 Claims, 9 Drawing Sheets

800

810 Buffer, within a set of request staging queues of an address translation circuit, address translation requests received from host interface circuits and each comprising a virtual address.

820 Store, within a set of pending response queues, respective address translation requests that are waiting for an address translation from a host system while maintaining an order as received within the set of request staging queues.

830 Reorder, within a set of reordering buffers, address translations according to the order maintained within the set of pending response queues, wherein each address translation comprises a PA mapped to a respective VA.

840 Send, from the reordering buffers, the address translations to a corresponding host interface circuit of the host interface circuits that sent a corresponding address translation request.

850 Store, in a cache coupled with the set of request staging queues and the set of reordering buffers, the address translations associated with the address translations requests for future access by the host interface circuits.

860 Reinsert, into the set of reordering buffers, a first address translation from the cache for a subsequent request for the first address translation by a host interface circuit.

FIG. 8

CACHING HOST MEMORY ADDRESS TRANSLATION DATA IN A MEMORY SUB-SYSTEM

REFERENCE TO RELATED APPLICATION

This application claims the benefit of U.S. Provisional Patent Application No. 63/421,659, filed Nov. 2, 2022, the entirety of which is incorporated herein by reference.

TECHNICAL FIELD

The present disclosure generally relates to a memory system, and more specifically, relates to the caching host memory address translation data in a memory sub-system.

BACKGROUND

A memory sub-system can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The present disclosure will be understood more fully from the detailed description given below and from the accompanying drawings of various embodiments of the disclosure.

FIG. 8 is a flow chart of an example method of caching host memory address translation data in a memory sub-system in accordance with some embodiments.

DETAILED DESCRIPTION

Figure 1:
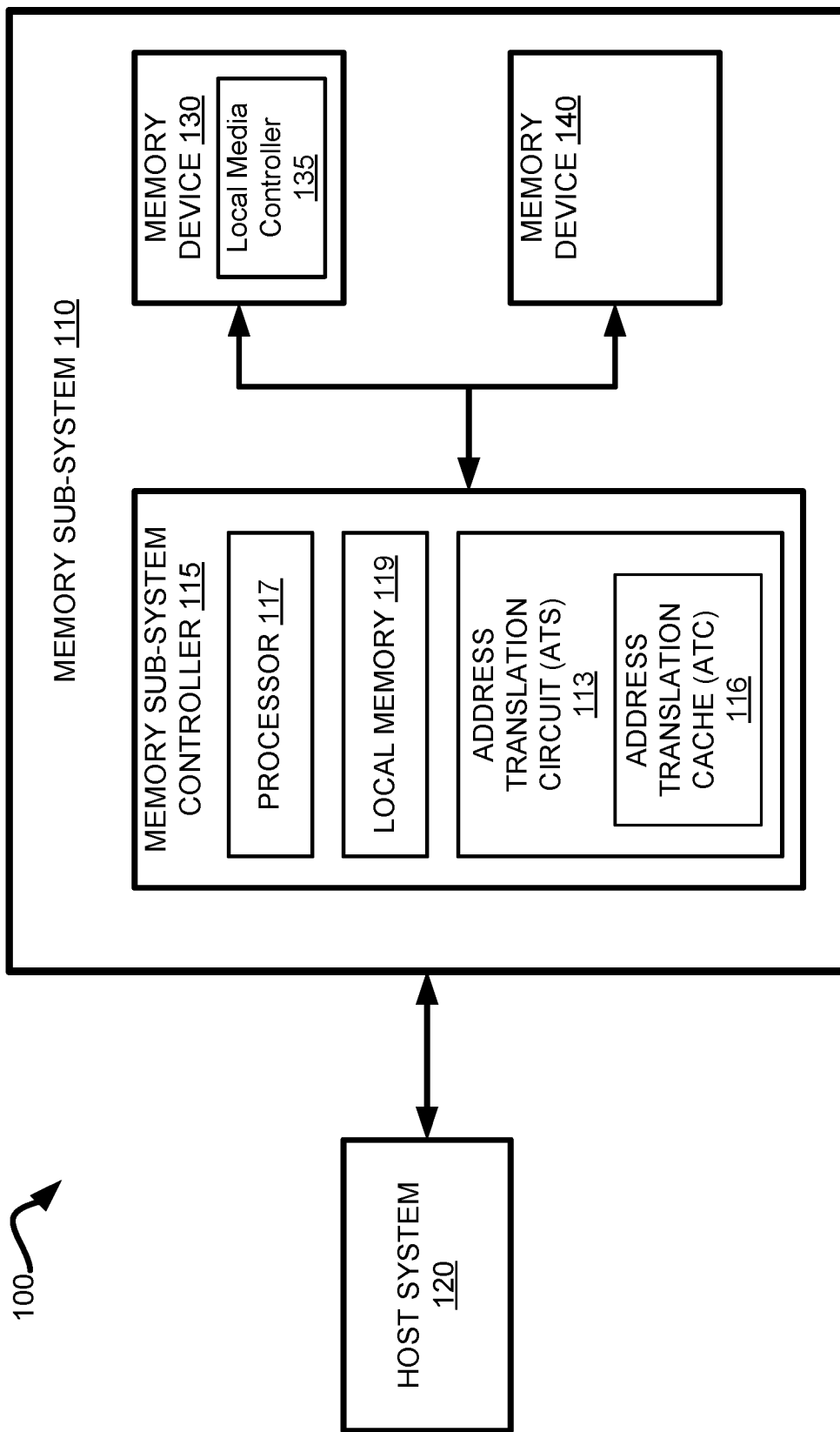
FIG. 1 illustrates an example computing environment for caching host memory address translation data in a memory sub-system in accordance with some embodiments of the present disclosure.

Aspects of the present disclosure are directed to caching host memory address translation data in a memory sub-system. A memory sub-system can be a storage device, a memory module, or a hybrid of a storage device and memory module. Examples of storage devices and memory modules are described below in conjunction with FIG. 1. In general, a host system can utilize a memory sub-system that includes one or more memory components (also hereinafter referred to as "memory devices"). The host system can provide data to be stored at the memory sub-system and can request data to be retrieved from the memory sub-system.

In requesting data be written to or read from a memory device, the host system typically generates memory commands (e.g., an erase (or unmap) command, a write command, or a read command) that are sent to a memory sub-system controller (e.g., processing device or "controller"). The controller then executes on these memory commands to perform an erase (or unmap) operation, a write operation, or a read operation at the memory device. Because the host operates in logical addresses, which are referred to as virtual addresses (or guest physical addresses) in the context of virtual machines (VMs) that run on the host system, the host system includes a root complex that serves as a connection between the physical and virtual components of the host system and a peripheral control interconnect express (PCIe) bus. This PCIe root complex can generate transaction requests (to include address translation) requests on behalf of entities of the host system, such as a virtual processing device in one of VMs.

The host system typically further includes a translation agent (TA) that performs translations, on behalf of the controller, of virtual addresses to physical addresses. To do so, the TA is configured to communicate with translation requests/responses through the PCIe root complex. In some systems, the TA is also known as an input/output memory management unit (IOMMU) that is executed by a hypervisor or virtual machine manager running on the host system. Thus, the TA can be a hardware component or software (IOMMU) with a dedicated driver.

The controller in these systems can be configured to include an address translation circuit, more specifically referred to as an address translation service (ATS), that is to request the TA to perform certain address translations from a virtual (or logical) address to an available (or assigned) physical address of the memory device. In this way, the address translation circuit (or ATS) dynamically determines address translations depending on the virtual address located in a corresponding memory command that is queued within host memory. Different aspects of the ATS obviate the need to pin a substantial amount of memory associated with an application being run by the host system.

Especially in support of multiple non-volatile memory express (NVMe) devices, the need to continually request the TA to perform address translations is a bottleneck and affects performance in terms of speed, latency, and quality-of-service in fulfilling memory commands. Performance can be increasingly impacted as submission, completion, I/O, and administrative queues located within the host memory get larger and the speeds of media of the memory devices increase. For example, the number of address translation requests and responses for command queues as well as for direct memory access (DMA) addresses can be slowed by having to move back and forth across the PCIe bus, which also generates additional I/O traffic that slows the entire memory sub-system.

Aspects of the present disclosure address the above and other deficiencies by implementing, within the address translation circuit of host interface circuitry within the controller, an address translation cache (ATC) that stores address translations corresponding to incoming address translation requests from host interface (HIF) circuits of the host interface circuitry. The ATC can store the address translations, associated with the address translation requests, for future access by the host interface circuits. These address translation requests, for example, may be related to processing of memory commands as well as the handling of DMA operations. In this way, when a cached address translation matches a subsequent (or later) address translation request from a HIF circuit (e.g., hits at the cache), the address translation circuit can retrieve and return the cached address translation to the HIF circuit without having to request the TA to perform the translation on behalf of the controller.

In some embodiments, for each memory command within a submission queue of the host memory, the address translation circuit can store a first address translation in the ATC corresponding to a current page targeted by the memory command (referenced in an address translation request) and store a second address translation in the ATC for a subsequent page that sequentially follows the current page according to virtual address numbering. This look-ahead buffering in the ATC of address translations for a predetermined number of submission queues enables greatly reducing the number of misses at the ATC while keeping a size of the ATC reasonable given the expense of cache memory, e.g., static random access memory (SRAM), availability at the controller. The hit rate at the cache can further be increased by this approach when the command (and other) queues in the host memory are arranged to sequentially store memory commands according to virtual addresses.

Therefore, advantages of the systems and methods implemented in accordance with some embodiments of the present disclosure include, but are not limited to, improving performance of the memory sub-system in terms of speed, latency, and throughput of handling memory commands. Part of the reason for increased performance is reducing the I/O traffic over the PCIe buses of the memory sub-system and at the host TA. The disclosed address translation circuit can also reduce the likelihood that previously cached translations will be invalidated and have to be re-fetched from the TA of the host system. Other advantages will be apparent to those skilled in the art of address translations within memory sub-systems, which will be discussed hereinafter. Additional details of these techniques are provided below with respect to FIGS. 1-7.

FIG. 1 illustrates an example computing environment 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

The computing environment 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. The host system 120 uses the memory sub-system 110, for example, to write data to the memory sub-system 110 and read data from the memory sub-system 110. As used herein, "coupled to" generally refers to a connection between components, which can be an indirect communicative connection or direct communicative connection (e.g., without intervening components), whether wired or wireless, including connections such as electrical, optical, magnetic, etc.

The host system 120 can be a computing device such as a desktop computer, laptop computer, network server, mobile device, embedded computer (e.g., one included in a vehicle, industrial equipment, or a networked commercial device), or such computing device that includes a memory and a processing device. The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory sub-system 110. The host system 120 can further utilize an NVM Express (NVMe) interface to access the memory components (e.g., memory devices 130) when the memory sub-system 110 is coupled with the host system 120 by the PCIe interface. The physical host interface can provide an interface for passing control, address, data, and other signals between the memory sub-system 110 and the host system 120.

The memory devices can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory. A 3D cross-point memory device is a cross-point array of non-volatile memory cells that can perform bit storage based on a change of bulk resistance, in conjunction with a stackable cross-gridded data access array. Additionally, in contrast to many flash-based memories, cross-point non-volatile memory can perform a write-in-place operation, where a non-volatile memory cell can be programmed without the non-volatile memory cell being previously erased.

Each of the memory devices 130 can include one or more arrays of memory cells such as single level cells (SLCs), multi-level cells (MLCs), triple level cells (TLCs), or quad-level cells (QLCs). In some embodiments, a particular memory component can include an SLC portion, and an MLC portion, a TLC portion, or a QLC portion of memory cells. Each of the memory cells can store one or more bits of data used by the host system 120. Furthermore, the memory cells of the memory devices 130 can be grouped to form pages that can refer to a unit of the memory component used to store data. With some types of memory (e.g., NAND), pages can be grouped to form blocks. Some types of memory, such as 3D cross-point, can group pages across die and channels to form management units (MUs).

Although non-volatile memory components such as NAND type flash memory and 3D cross-point are described, the memory device 130 can be based on any other type of non-volatile memory, such as read-only memory (ROM), phase change memory (PCM), magneto random access memory (MRAM), negative-or (NOR) flash memory, electrically erasable programmable read-only memory (EEPROM).

The memory sub-system controller 115 can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 may not include a memory sub-system controller 115, and may instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical block address and a physical block address that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. In some embodiments, the memory devices 130 are managed memory devices, which is a raw memory device combined with a local controller (e.g., local media controller 135) for memory management within the same memory device package. An example of a managed memory device is a managed NAND (MNAND) device.

The memory sub-system 110 includes an address translation circuit 113 and an address translation cache (or ATC 116) that can be used to perform caching of host memory address translation used for queues, physical page regions (PRPs), scatter gather lists (SGLs), and data transfer in the memory sub-system 110. For example, the address translation circuit 113 can receive an address translation request from a HIF circuit that is handling a memory command, request the TA perform a translation of a virtual address located within the memory command, and upon receiving the physical address, store a mapping between the virtual address and the physical address (also referred to as L2P mapping) in the ATC 116. Upon receiving a subsequent address translation request that contains the same virtual address, the address translation circuit 113 can verify that the virtual address is a hit at the ATC 116 and directly copy the corresponding address translation from the ATC to a pipeline of the address translation circuit 113 that returns the corresponding address translation to the requesting HIF circuit. Similar caching of address translations can also be performed for DMA operations, which will be discussed in more detail. Further details with regards to the operations of the address translation circuit 113 and the ATC 116 are described below.

Figure 2:
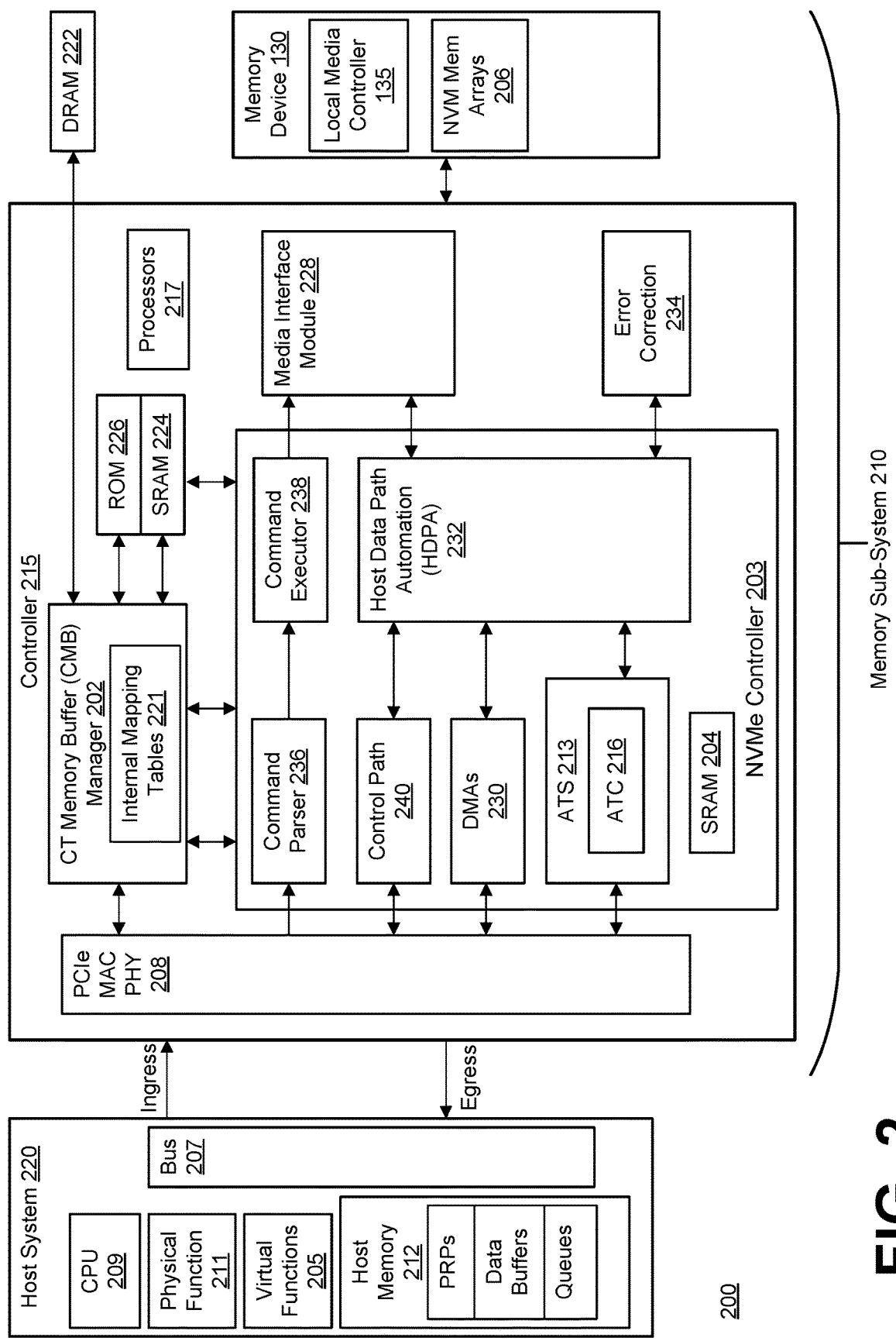
FIG. 2 is a schematic block diagram of a system (or device) implementing peripheral component interface express (PCIe) and non-volatile memory express (NVMe) functionality within which the disclosed caching operates in accordance with some embodiments.

FIG. 2 is a schematic block diagram of a system 200 (or device) implementing peripheral component interface express (PCIe) and non-volatile memory express (NVMe) functionality within which the disclosed caching operates in accordance with some embodiments. In various embodiments, the system 200 includes a host system 220 (such as the host system 120), a memory sub-system 210 (such as the memory sub-system 110) that in turn includes a controller 215 (such as the controller 115), or more memory device(s) 130, and DRAM 222. In some embodiments, aspects (to include hardware and/or firmware functionality) of the controller 215 is included in the local media controller 135.

In embodiments, the host system 220 includes a central processing unit (CPU) 209 connected to a host memory 212, such as DRAM or other main memories. An application program may be stored to memory space 212 for execution by components of the host system 220. The host system 220 includes a bus 207, such as a memory device interface, which interacts with a host interface 208, which may include media access control (MAC) and physical layer (PHY) components, of memory device 130 for ingress of communications from host system 220 to memory device 130 and egress of communications from memory device 130 to host system 220. Bus 207 and host interface 208 operate under a communication protocol, such as a Peripheral Component Interface Express (PCIe) serial communication protocol or other suitable communication protocols. Other suitable communication protocols include Ethernet, serial attached SCSI (SAS), serial AT attachment (BATA), any protocol related to remote direct memory access (RIMA) such as Infiniband, iWARP, or RDMA over Converged Ethernet (RoCE), and other suitable serial communication protocols.

Memory device 130 may also be connected to host system 220 through a switch or a bridge. A single host system 220 is shown connected with the memory device 130, and the PCI-SIG Single Root I/O Virtualization and Sharing Specification (SR-IOV) single host virtualization protocol supported as discussed in greater detail below, where the memory device 130 may be shared by multiple hosts, where the multiple hosts may be a physical function 211 (PE) and one or more virtual functions 205 (VFs) of a virtualized single physical host system. In other embodiments, it is contemplated that the SR-IOV standard for virtualizing multiple physical hosts may be implemented with features of the disclosed system and method.

In embodiments, the non-volatile memory arrays (or NVM 206) of memory device 130 may be configured for long-term storage of information as non-volatile memory space and retain information after power on/off cycles. In the same manner as described with respect to FIG. 1, NVM 206 in FIG. 2 can include one of more dice of NAND type flash memory or other memory discussed with reference to FIG. 1.

The memory sub-system 210 includes a controller 215 (e.g., processing device) which manages operations of memory device 130, such as writes to and reads from NVM 206. Controller 215 may include one or more processors 217, which may be multi-core processors. Processors 217 can handle or interact with the components of memory device 130 generally through firmware code.

Controller 215 may operate under NVM Express (NVMe) protocol, but other protocols are applicable. The NVMe protocol is a communications interface/protocol developed for SSDs to operate over a hast and a memory device that are linked over a PCIe interface. The NVMe protocol provides a command queue and completion path for access of data stored in memory device 130 by host system 220.

Controller 215 also includes a controller memory buffer (CMB) manager 202. CMB manager 202 may be connected to the DRAM 222, to a static random access memory (SRAM) 224, and to a read-only memory (ROM) 226. The CMB manager 202 may also communicate with the NVM 206 through a media interface module 228. The DRAM 22.2 and SRAM 224 are volatile memories or cache buffer(s) for short-term storage or temporary memory during operation of memory device 130. In some embodiments, SRAM 224 includes tightly-coupled memory as well. Volatile memories do not retain stored data if powered off. The DRAM generally requires periodic refreshing of stored data while SRAM does not require refreshing. While SRAM typically provides faster access to data than DRAM, it may also be more expensive.

Controller 215 executes computer-readable program code (e.g., software or firmware) executable instructions (herein referred to as "instructions"). The instructions may be executed by various components of controller 215, such as processor 218, logic gates, switches, application specific integrated circuits (ASICs), programmable logic controllers, embedded microcontrollers, and other components of controller 215.

The instructions executable by the controller 215 for carrying out the embodiments described herein are stored in a non-transitory computer-readable storage medium. In certain embodiments, the instructions are stored in a non-transitory computer readable storage medium of memory device 130, such as in a read-only memory (ROM) or NVM 206. Instructions stored in the memory device 130 may be executed without added input or directions from the host system 220. In other embodiments, the instructions are transmitted from the host system 220. The controller 215 is configured with hardware and instructions to perform the various functions described herein and shown in the figures.

Controller 215 may also include other components, such as a NVMe controller 203, a media interface module 228 coupled between the NVMe controller 203 and the memory device 130, and an error correction module 234. In embodiments, the NVMe controller 203 includes SRAM 204, an address translation circuit 213 (ATS) having an address translation cache 216, a direct memory access (DMA) module 230, a host data path automation (HDPA) circuit 232, a command parser 236, a command executor 238, and a control path 240. In various embodiments, the address translation circuit 213 is the same as the address translation circuit 113 and the address translation cache 216 is the same as the address translation cache 116, all of which will be discussed in more detail hereinafter. The SRAM 204 may be internal SRAM of the NVMe controller 203 that is separate from the SRAM 224. The CMB manager 202 may be directly coupled to the NVMe controller 203 such that the NVMe controller 203 can interact with the CMB manager 202 to access the DRAM 222 and SRAM 224.

In embodiments, the media interface module 228 interacts with the NVM 206 for read and write operations. DMA module 230 executes data transfers between host system 220 and memory device 130 without involvement from CPU 209. The HDPA circuit 232 controls the data transfer while activating the control path 240 for fetching PRPs/SGLs, posting completion and interrupts, and activating the DMAs 230 for the actual data transfer between host system 220 and memory device 130. Error correction module 234 corrects the data fetched from the memory arrays in the NVM 206. Command parser 236 parses commands to command executor 238 for execution on media interface module 228.

Figure 3:
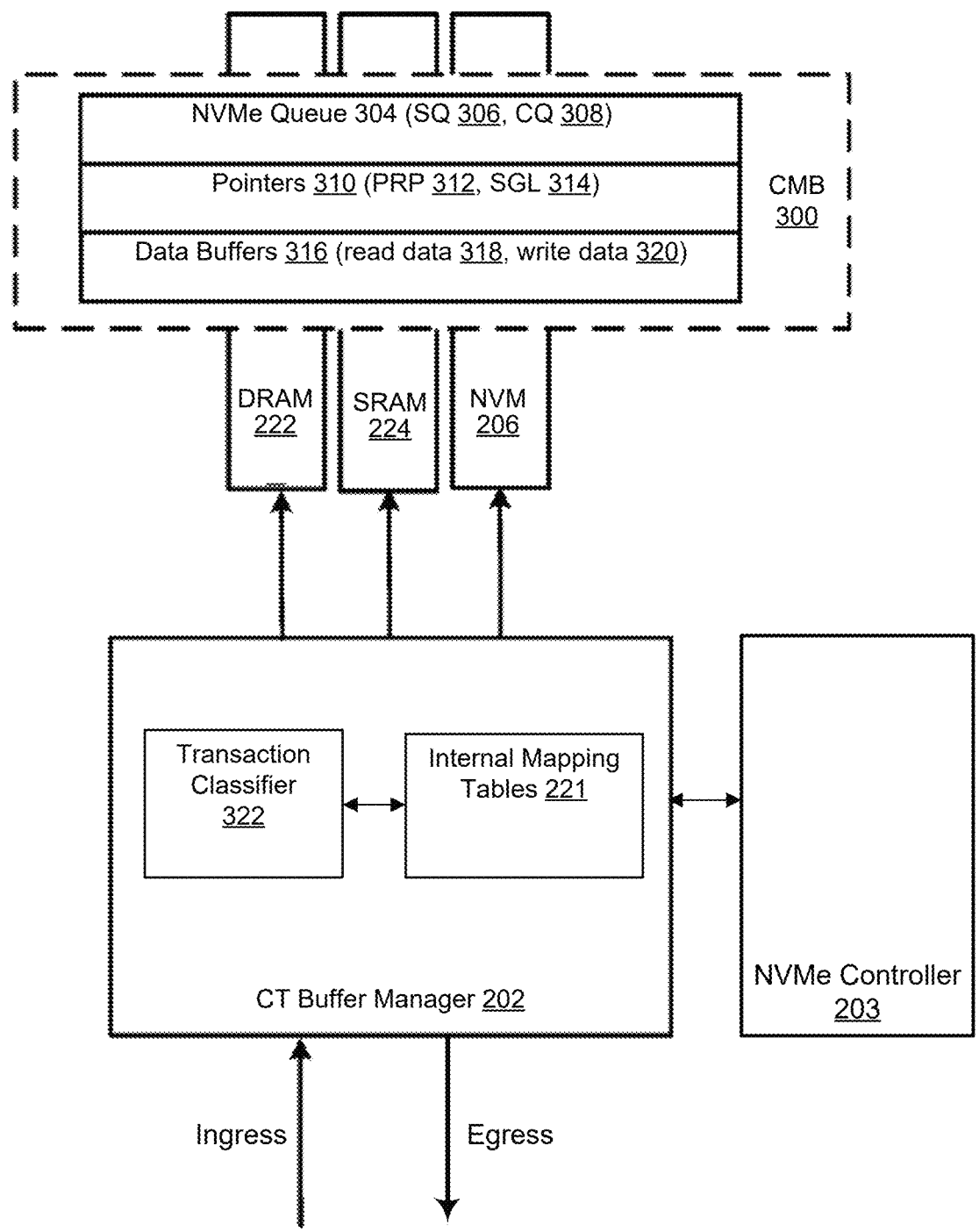
FIG. 3 is a schematic diagram illustrating an embodiment of a controller memory buffer (CMB) manager of a storage device.

FIG. 3 is a schematic diagram illustrating an embodiment of the CMB manager 202 of system 200 of FIG. 2, but other systems are possible. The CMB manager 202 manages data transactions between host system 220 and a memory device 130 having a controller memory buffer (CMB) 300. The CMB 300 and is a controller memory space which may span across one or more of the DRAM 222, SRAM 224, and/or NVM 206. The contents in CMB 300 typically do not persist across power cycles, so the CMB manager 202 can rebuild the CMB 300 after the system 200 powers on.

One or more types of data structures defined by the NVMe protocol may be stored in the CMB 300 by the CMB manager 202 or may be stored in host memory 212 (FIG. 2). As described in greater detail below, the host system 220 may initialize the CMB 300 prior to CMB manager 202 storing NVMe data structures thereto. At initialization phase, memory device 130 may advertise to host system 220 the capability and the size of CMB 300 and may advertise which NVMe data structures may be stored into CMB 300. For example, memory device 130 may store one or more of the NVMe data structures into CMB 300, including NVMe queues 304 such as submission queues (SQ) 306, completion queues (CQ) 308, PRP lists 312, SGL segments 314, write data 320, read data. 318, and combinations thereof.

The NVMe protocol standard is based on a paired submission and completion queue mechanism. Commands are placed by host software into a submission queue (SQ). Completions are placed into the associated completion queue (CQ) by the controller 215. The host system 220 (or device) may have multiple pairs of submission and completion queues for different types of commands. Responsive to a notification by the host system 220, the controller 215 fetches the command from the submission queue. Thereafter, the controller 215 processes the command, e.g., performs internal command selection, executes the command (such as performing a write or a read), and the like. After processing the command, the controller 215 places an entry in the completion queue, with the entry indicating that the execution of the command has completed. The controller 215 then generates an interrupt to the host device indicating that an entry has been placed on the completion queue. The host system 220 reviews the entry of the completion queue and then notifies the controller 215 that the entry of the completion queue has been reviewed. As will be discussed in more detail, the address translation circuit 213 may help perform these functions of the controller 215 just discussed.

In general, submission and completion queues are allocated within the host memory 212 where each queue might be physically located contiguously or non-contiguously in the host memory. However, the CMB feature, such as is supported in the NVMe standard, enables the host system 220 to place submission queues, completion queues, physical page region (PRP) lists, scatter gather list (SGL) segments and data buffers in the controller memory rather than in the host memory 212.

The controller 215 (FIG. 2) also generates internal mapping tables 221 for use by the CMB manager 202 to map PF and VF data to the correct CMB locations in controller memory DRAM 222 or SRAM 224. The mapping table 221 itself is typically stored in flip-flops or the DRAM 222 to reduce or eliminate any latency issues. In one implementation, the mapping table may have entries for the PF and each VF, for example.

The NVMe standard supports an NVMe virtualization environment. Virtualized environments may use an NVM system with multiple controllers to provide virtual or physical hosts (also referred to herein as virtual or physical functions) direct input/output (I/O) access. The NVM system includes of primary controller(s) and secondary controller(s), where the secondary controller(s) depend on primary controller(s) for dynamically assigned resources. A host may issue the Identify command to a primary controller specifying the Secondary Controller List to discover the secondary controllers associated with that primary controller. The SR-IOV defines extensions to PCI Express that allow multiple System Images (SIs), such as virtual machines running on a hypervisor, to share PCI hardware resources (see FIG. 4).

A physical function (PE) is a PCIe function that supports the SR-IOV capability, which in turn allows it to support one or more dependent virtual functions (Vis). These PFs and VEs may support NVMe controllers that share an underlying NVM subsystem with multi-path and namespace sharing capabilities. In such a virtualization environment, the physical function, sometimes referred to as the primary function, and each virtual function is allocated its own CMB that is a portion of the total controller memory available for CMB use. As used herein, the term physical function refers to a PCIe function that supports SR-TOV capabilities where a single physical host is divided into the physical function and multiple virtual functions that are each in communication with the controller of the memory device. The terms physical function and primary function may be used interchangeably herein.

In an embodiment, the controller 215 advertises the CMB 300 availability only to the physical function (Ph) of a virtualized host system such as the host system 220, where a virtualized host system has a single physical function 211 and one or more virtual functions 205 (or VFs). Also, the advertised CMB 300 availability may be in the form of a total CMB size available for all functions (physical and any virtual functions) such that the physical function 211 may selectively assign itself and all other virtual functions 205 any desired portion of the advertised total CMB sire available.

The controller 215 may then store the physical function selected portions of the available CMB 300 in NVMe registers dedicated to each physical function 211 and virtual function, respectively. The virtual function may store a different relative portion size of the advertised CMB size in each NVMe register to account for the different needs the physical function 211 sees for itself and each virtual function. Once the physical function 211 assigns the different amounts and regions of the advertised CMB available for host access (e.g. for direct access by the primary and virtual functions) during the initiation stage, these settings may be managed by the controller 215 to provide access to the respective primary or virtual functions during operations of the memory device.

CMB manager 202 may include a transaction classifier module 322 to classify received host write transactions to CMB 300. Host write transactions to CMB 300 may be associated with host write command and host read commands. In certain embodiments, transaction classifier module 322 may classify the host write transactions into one of the three NVM data structure groups of NVMe queues 304, pointers 310, and data buffers 316. NVMe queues 304 include host submission queues (SQs) 306 and host completion queues (CQs) 308. Pointers 310 may include physical region pages (PRP) lists 312 and scatter gather list (SGL) segments 314. PRP lists 312 contain pointers indicating physical memory pages populated with user data or going to be populated with user data, such as for read or write commands in NVMe queues 304. SGL segments 314 include pointers indicating the physical addresses of host memory 212 in which data should be transferred from for write commands and in which data should be transferred to for read commands. Data buffers 316 may contain write data 320 to be written to NVM 206 associated with a write command contain and/or read data. 318 from memory device 130 associated with a read command.

In certain embodiments, NVMe queues 304, pointers 310, and data buffers 316 associated with a particular command may be stored in the CMB 300 by CMB manager 202 to reduce command execution latency by the memory device 130. For example, a host command entry written to SQs-implemented CMB 300 avoids fetching the host command entry through the PCIe fabric which may include multiple switches if the SQ is located in the host memory 212. PRP lists 312 and SGL segments 314 written to CMB 300 of memory device 130 avoids a separate fetch of the PRP lists 312 and SGL segments 314 through the Pete fabric if the PRP lists and SGL segments are located in host memory space. Write data 320 written to CMB 300 of memory device 130 avoid having memory device 130 fetch the write data from host memory 212.

The address translation circuit 213 may communicate through the host interface 208 with the host system 220 and components of the memory sub-system 210. The address translation circuit 213 may also be incorporated, at least in part, within the host interface 208, as will be discussed in more detail. The address translation circuit 213 may also retrieve commands from SQs 306, handle the commands to include retrieving the address translation from the ATC 216, if present, and submit a completion notification to the CQs 308 for the host system 220. Thus, in at least some embodiments, the address translation circuit 213 may include or be integrated with the command parser 236, the command executor 238, and the DMAs 230.

Figure 4:
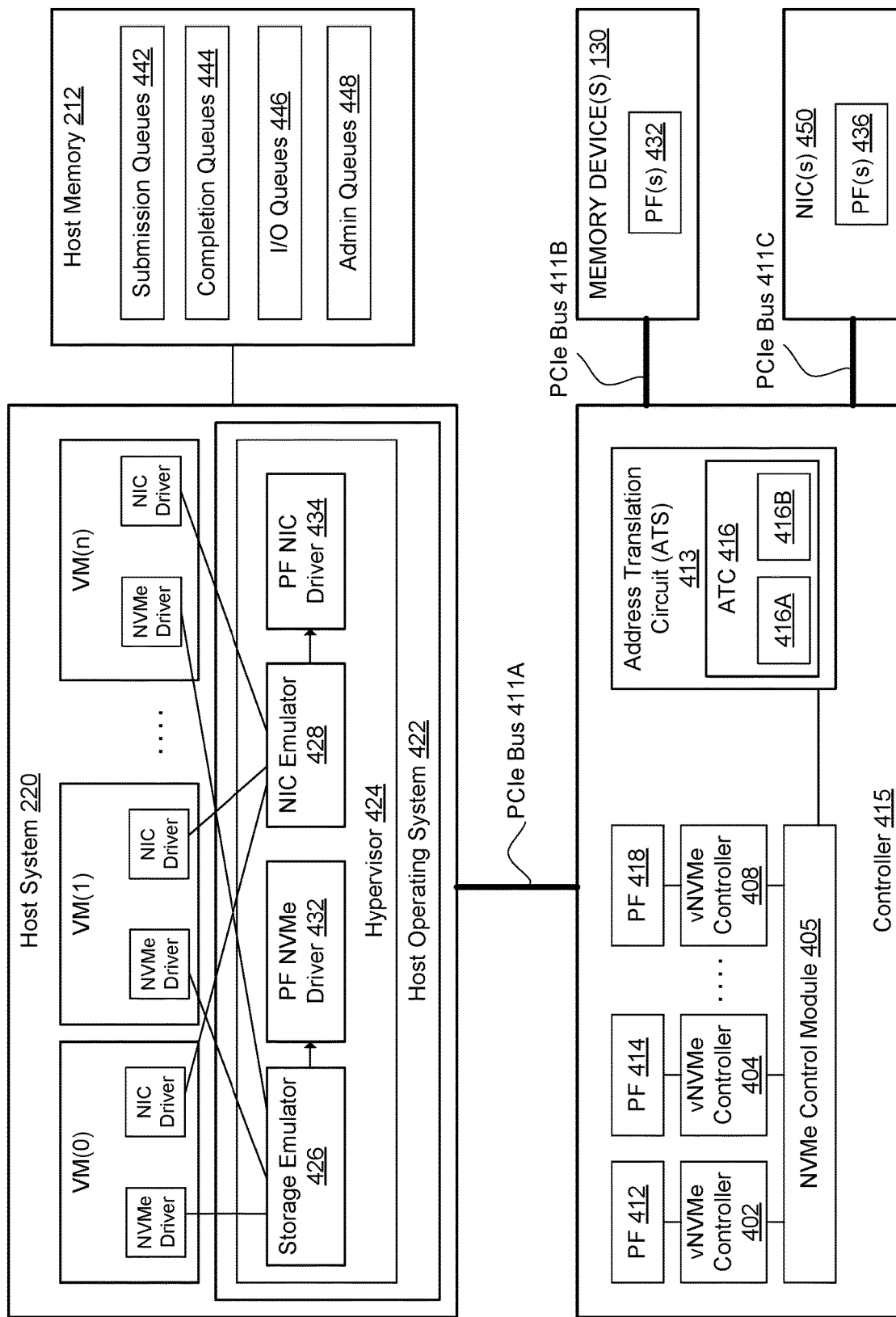
FIG. 4 is an example physical host interface between a host system and a memory sub-system implementing caching host memory address translation data in accordance with some embodiments.

FIG. 4 is an example physical host interface between a host system 220 and a memory sub-system implementing caching host memory address translation data in accordance with some embodiments. In at least some embodiments, the example physical host interface also implements NVMe direct virtualization, as was discussed with reference to FIGS. 2-3. In one embodiment, a controller 415 of the memory sub-system is coupled to host system 220 over a physical host interface, such as a PCIe bus 411A. In one embodiment, a NVMe control module 405 running on the controller 415 generates and manages a number of virtual NVMe controllers 402-408 within the controller 415. The virtual NVMe controllers 402-408 are virtual entities that appear as physical controllers to other devices, such as the host system 220, connected to PCIe bus 411A by virtue of a physical function 412-418 associated with each virtual NVMe controller 402-408. FIG. 4 illustrates three virtual NVMe controllers 402-408 and three corresponding physical functions 412-418. In other embodiments, however, there may be any other number of NVMe controllers, each having a corresponding physical function.

Each of the virtual NVMe controllers 402-408 manages storage access operations for the underlying memory device 130. For example, virtual NVMe controller 402 may receive data access requests from host system 220 over PCIe bus 411A, including requests to read, write, or erase data. In response to the request, virtual NVMe controller 402 may identify a physical memory address in memory device 130 pertaining to a virtual memory address in the request, perform the requested memory access operation on the data stored at the physical address and return requested data and/or a confirmation or error message to the host system 220, as appropriate. Virtual NVMe controllers 404-408 may function in the same or similar fashion with respect to data access requests for one or more memory device(s) 130.

In embodiments, a NVMe control module 405 associates one of physical functions 412-418 with each of virtual NVMe controllers 402-408 in order to allow each virtual NVMe controller 402-408 to appear as a physical controller on the PCIe bus 411A. For example, physical function 412 may correspond to virtual NVMe controller 402, physical function 414 may correspond to virtual NVMe controller 404, and physical function 418 may correspond to virtual NVMe controller 408. Physical functions 412-418 are fully featured PCIe functions that can be discovered, managed, and manipulated like any other PCIe device, and thus can be used to configure and control a PCIe device (e.g., virtual NVMe controllers 402-408). Each physical function 412-418 can have some number of virtual functions (VFs) associated therewith. The VFs are lightweight PCIe functions that share one or more resources with the physical function and with virtual functions that are associated with that physical function. Each virtual function has a PCI memory space, which is used to map its register set. The virtual function device drivers operate on the register set to enable its functionality and the virtual function appears as an actual PCIe device, accessible by host system 220 over the PCIe bus 411A.

In at least some embodiments, the controller 415 is further configured to control execution of memory operations associated with memory commands from the host system 220 at one or more memory devices(s) 130 and one or more network interface cards (NIC(s)) 450, which are actual physical memory devices. In these embodiments, the controller 415 communicates with the memory devices 130 over a second PCIe bus 411B and communicates with the NICs 450 over a third PCIe bus 411C. Each memory device 130 can support one or more physical functions 432 and each NIC 450 can support one or more physical functions 436. Each physical function 432-436 can also have some number of virtual functions (VFs) associated therewith.

In these embodiments, each physical function 412-418 and 432-436 can be assigned to any one of virtual machines VM(0)-VM(n) in the host system 220. When I/O data is received at a virtual NVMe controller 402-408 from a virtual machine, a virtual machine driver (e.g., NVMe driver) provides a guest physical address for a corresponding read/write command. The NVMe control module 405 can translate the physical function number to a bus, device, and function (BDF) number and then add the command to a direct memory access (DMA) operation to perform the DMA operation on the guest physical address. In one embodiment, the controller 115 further transforms the guest physical address to a system physical address for the memory sub-system 110.

Furthermore, each physical function 412-418 and 432-436 can be implemented in either a privileged mode or normal mode. When implemented in the privileged mode, the physical function has a single point of management that can control resource manipulation and storage provisioning for other functions implemented in the normal mode. In addition, a physical function in the privileged mode can perform management options, including for example, enabling/disabling of multiple physical functions, storage and quality of service (QoS) provisioning, firmware and controller updates, vendor unique statistics and events, diagnostics, secure erase/encryption, among others. Typically, a first physical function can implement a privileged mode and the remainder of the physical functions can implement a normal mode. In other embodiments, however, any of the physical functions can be configured to operate in the privileged mode. Accordingly, there can be one or more functions that run in the privileged mode.

The host system 220 can run multiple virtual machines VM(0)-VM(n), by executing a software layer, often referred to as a hypervisor 424, above the hardware and below the virtual machines, as schematically shown in FIG. 4. In one illustrative example, the hypervisor 424 may be a component of a host operating system 422 executed by the host system 220. Alternatively, the hypervisor 424 may be provided by an application running under the host operating system 422, or may run directly on the host system 220 without an operating system beneath the hypervisor 424. The hypervisor 424 may abstract the physical layer, including processors, memory, and I/O devices, and present this abstraction to virtual machines VM(0)-VM(n) as virtual devices, including virtual processors, virtual memory, and virtual I/O devices. Virtual machines VM(0)-VM(n) may each execute a guest operating system which may utilize the underlying virtual devices, which may, for example, map to the memory device 130 or the NIC 450 managed by one of virtual NVMe controllers 402-408 in the memory sub-system. One or more applications may be running on each VM under the guest operating system.

In various embodiments, each virtual machine VM(0)-VM(n) may include one or more virtual processors and/or drivers. Processor virtualization may be implemented by the hypervisor 424 scheduling time slots on one or more physical processors such that from the perspective of the guest operating system, those time slots are scheduled on a virtual processor. Memory virtualization may be implemented by a page table (PT) which is a memory structure translating guest memory addresses to physical memory addresses. The hypervisor 424 may run at a higher privilege level than the guest operating systems, and the latter may run at a higher privilege level than the guest applications.

In one embodiment, there may be multiple partitions on host system 220 representing virtual machines VM(0)-VM(n). A parent partition corresponding to virtual machine VM(0) is the root partition (i.e., root ring 0) that has additional privileges to control the life cycle of other child partitions (i.e., conventional ring 0), corresponding, for example, to virtual machines VM(1) and VM(n). Each partition has corresponding virtual memory, and instead of presenting a virtual device, the child partitions see a physical device being assigned to them. When the host system 220 initially boots up, the parent partition can see all of the physical devices directly. The pass through mechanism (e.g., PCIe Pass-Through or Direct Device Assignment) allows the parent partition to assign an NVMe device (e.g., one of virtual NVMe controllers 402-408) to the child partitions. The associated virtual NVMe controllers 402-408 may appear as a virtual storage resource to each of virtual machines VM(0), VM(1), VM(n), which the guest operating system or guest applications running therein can access. In one embodiment, for example, virtual machine VM(0) is associated with virtual NVMe controller 402, virtual machine VM(1) is associated with virtual NVMe controller 404, and virtual machine VM(n) is associated with virtual NVMe controller 408. In other embodiments, one virtual machine may be associated with two or more virtual NVMe controllers. The virtual machines VM(0)-VM(n), can identify the associated virtual NVMe controllers using a corresponding bus, device, and function (BDF) number, as will be described in more detail below.

In some embodiments, the hypervisor 424 also includes a storage emulator 426 coupled to the NVMe drivers on the virtual machines VM(0)-VM(n) and that is coupled with a physical function NVMe driver 432 of the hypervisor 424. The physical function NVMe driver 432 can drive, with the help of the virtual NVMe controllers 402-408, the physical functions 412-418 over the PCIe bus 411A and also drive the physical functions 432 available on the memory devices 130 over the PCIe bus 411A and the second PCIe bus 411B. Further, the hypervisor can include a NIC emulator 428 coupled to NIC drivers on the virtual machines VM(0)-VM(n) and that is coupled with a physical function NIC driver 436 of the hypervisor 424. The physical function NIC driver 434 controls the PFs 436 of the NICs 450 over the PCIe bus 411A and the third PCIe bus 411C in various embodiments.

In at least some embodiments, the host system 220 submits memory commands (e.g., erase (or unmap), write, read) to a set of submission queues 442, input/output (I/O) commands to an set of I/O queues 446, and administrative ("admin") commands to a set of admin queues 448, which are stored in the host memory 212 of the host system 220 or in one of the CMB 300 (FIG. 3). The controller 415 can retrieve these memory commands over the PCIe bus 411A and handle each memory command in turn, typically according to a priority (such as handling reads in front of writes). When the controller 415 has completed handling a memory command that resides in the set of submission queues 442, the controller 415 returns an acknowledgement of memory command completion by submitting a completion entry in a corresponding completion queue of a set of completion queues 444, which are also stored in the host memory 212. In some embodiments, the host memory 212 is composed of DRAM or other main memory type memory. In various embodiments, the queues 442, 444, 446, 448 can number into the hundreds (or thousands) and are ordered sequentially (e.g., contiguously) according to virtual addresses of the memory commands. In other words, the queuing of memory commands within these queues is ordered sequentially based on the virtual addresses in those memory commands within a virtual memory space.

In disclosed embodiments, the controller 415 further includes an address translation circuit 413, which includes an ATC 416 (or "cache") similarly introduced with reference to FIGS. 1-3. The ATC 416 may be static random access memory (SRAM), tightly-coupled memory (TCM), or other fast-access memory appropriate for use as cache. The address translation circuit 413 can be coupled to NVMe control module 405 and generally coupled to PCIe protocol components (such as the virtual NVMe controllers) of the controller 415. In this way, the address translation circuit 413 provides host interface circuitry that facilitates obtaining address translations and other handling of memory commands retrieved from the queues 442, 444, 448. The address translation services (ATS) of the address translation circuit 413 further enables direct connection between the one or more memory devices 130 and the virtual machines VM(0)-VM(n) to achieve a near PCIe line rate of data communication performance, which bypasses the hypervisor 424.

As explained, the address translation circuit 413 can receive (or retrieve) an address translation request from a HIF circuit that is handling a memory command, request the TA perform a translation of a virtual address located within the memory command, and upon receiving the physical address, store a mapping between the virtual address and the physical address (also referred to as L2P mapping) in the ATC 416. Upon receiving a subsequent address translation request that contains the same virtual address, the address translation circuit 413 can verify that the virtual address is a hit at the ATC 416 and directly copy the corresponding address translation from the ATC to a pipeline of the address translation circuit 413 that returns the corresponding address translation to the requesting HIF. Similar caching of address translations can also be performed for DMA operations, which will be discussed in more detail. Accordingly, the functionality of the address translation circuit 413 can enable, for many address translation requests, bypassing any need to interact with the hypervisor 424, which being software, is the bottleneck and slows performance of obtaining address translations in the absence of caching such address translations. The resultant speed, latency, and throughput performance increases through the ATS functionality can be significant.

Figure 5:
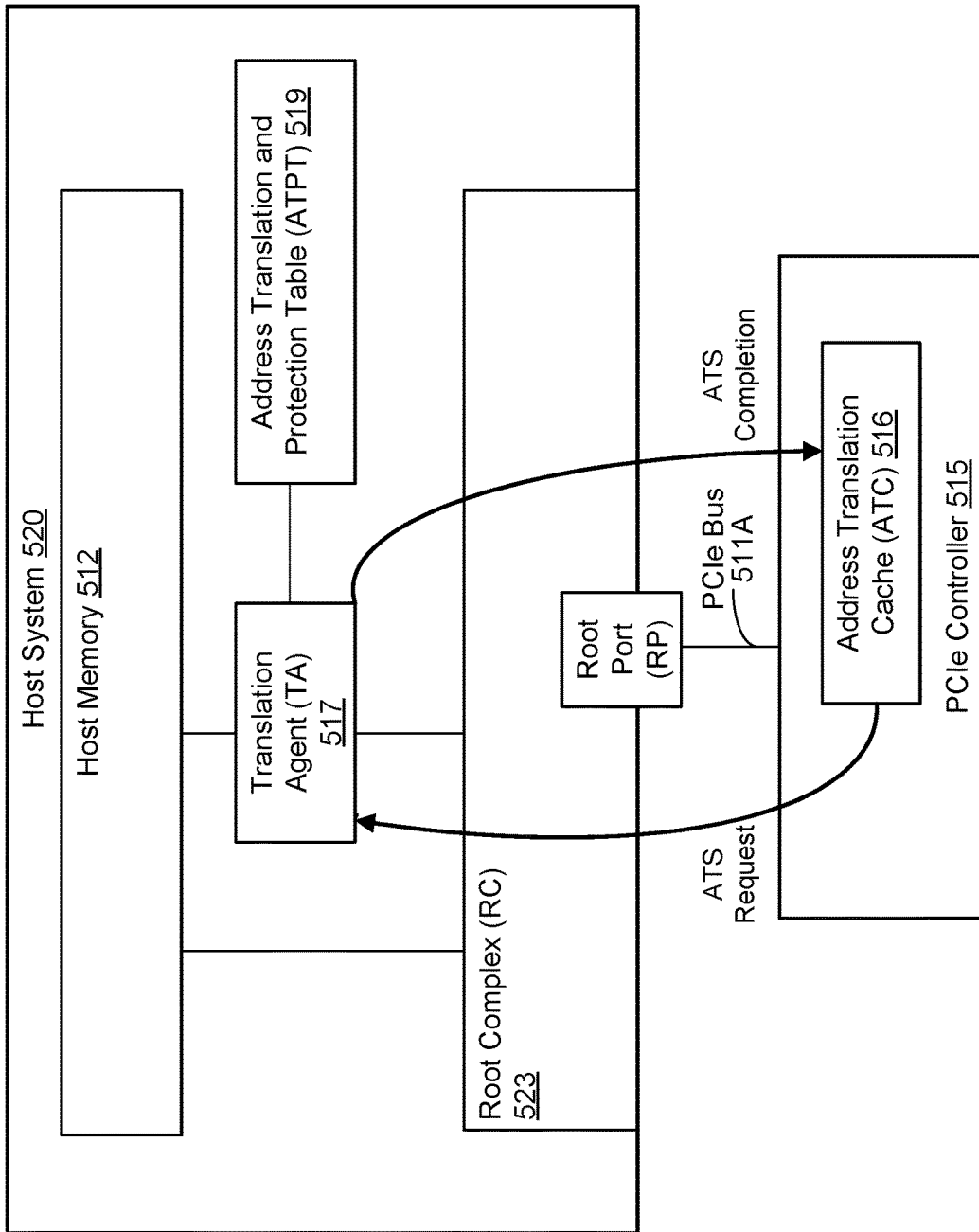
FIG. 5 is a system in which a memory sub-system controller contains an address translation cache (ATC) in accordance with some embodiments.

FIG. 5 is a system 500 in which the memory sub-system controller, such as a PCIe controller 515, contains an address translation cache (ATC) 516 in accordance with some embodiments. Within the system 500, a host system 520 (or any host system discussed herein) includes a translation agent (TA) 517 and an address translation and protection table (ATPT) 519, together which can be employed by the host system 520 to provide address translations to the PCIe controller 515 according to PCIe protocol. Specifically, the TA 517 can return a physical page address in response to a submitted virtual address in an address translation request or a "no translation" in the case the corresponding physical page has been swapped out and thus there is not current translation for the virtual address.

These address translations can be associated with memory commands resident in the host memory 512 (and/or CMB 300) being handled by the PCIe controller 515 (or by other PCIe device or virtual PCIe device). To provide translations, the TA 517 is configured to communicate with address translation requests/responses through a PCIe root complex 523. In some systems, the TA 517 is also known as an input/output memory management unit (IOMMU) that is executed by the hypervisor 424 or virtual machine manager running on the host system 520. Thus, the TA 517 can be a hardware component or software (IOMMU) with a dedicated driver.

In various embodiments, to avoid such increased I/O traffic over a PCIe bus 511A between the host system 520 and the PCIe controller 515, the address translations provided to the PCIe controller 515 can be cached in the ATC 516 and accessed to fulfill later (or subsequent) ATS-generated address translation requests without having to go back to the TA 517 with renewed requests for each needed translation. If entries in the ATC 516 are invalidated due to assignment changes between the virtual and physical addresses within the TA 517 and the ATPT 519, then the PCIe controller 515 (e.g., the ATS in the PCIe controller 515) can purge corresponding entries within the ATC 516 and in other ATS queues in host interface circuitry.

Figure 6:
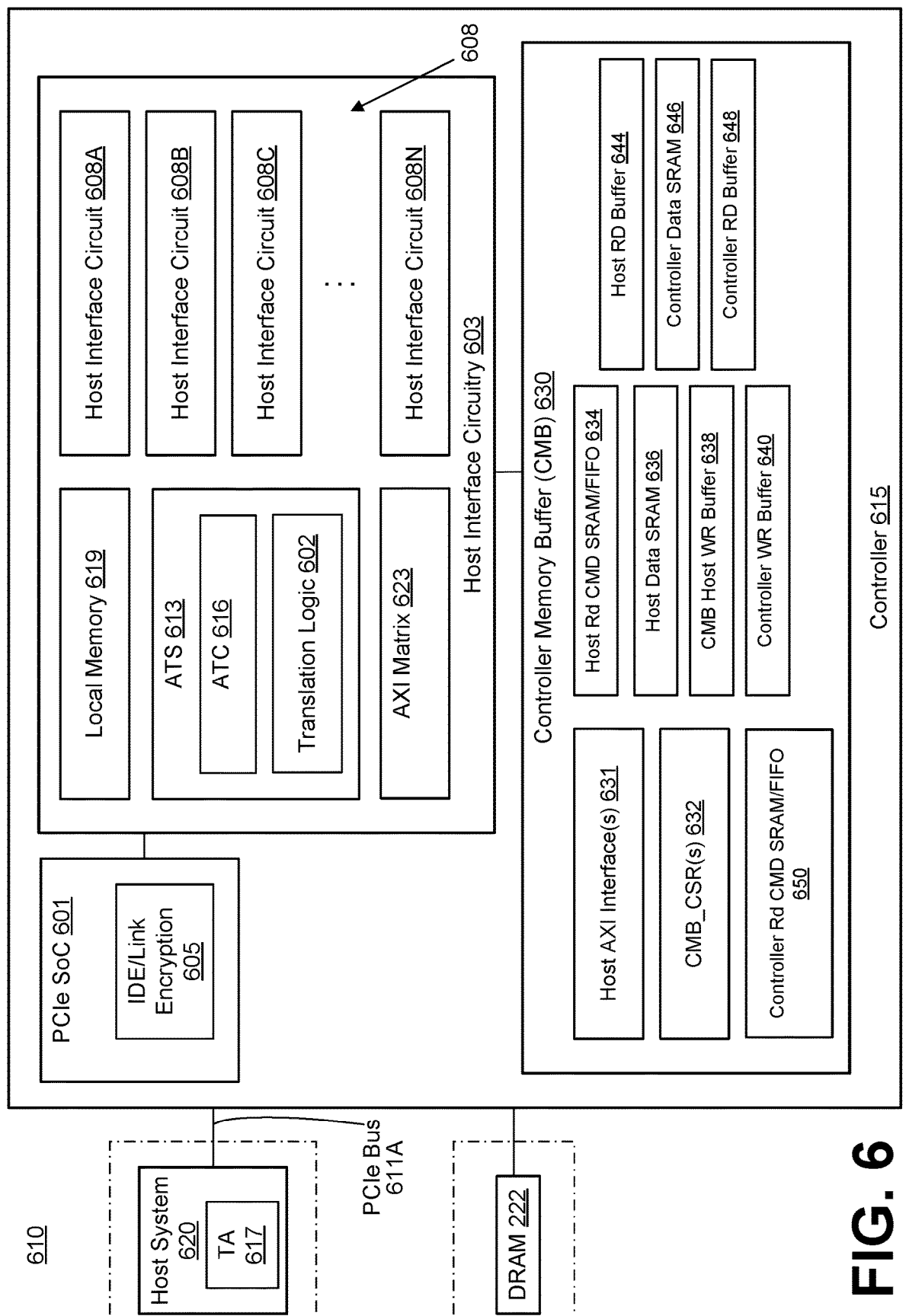
FIG. 6 is a memory sub-system for caching host memory address translation data for multiple host interface circuits in accordance with some embodiments.

FIG. 6 is a memory sub-system 610 for caching host memory address translation data for multiple host interface circuits in accordance with some embodiments. In various embodiments, the memory sub-system 610 can be the same as the memory sub-system 110 of FIG. 1 or the memory sub-system 210 of FIG. 2 or that of FIG. 5. In these embodiments, the memory sub-system 610 includes a controller 615 having a controller memory buffer (CMB) 630. In some embodiments, the controller 615 is the controller 115, 215, or 415, the local media controller 135, or a combination thereof (see FIG. 1). In at least one embodiment, the CMB 630 is the CMB 300 discussed with reference to FIG. 3, and thus may also include NVM of the memory device 130.

In various embodiments, the CMB 630 includes host Advanced eXtensible Interface (AXI) interfaces 631, CMB control/status register(s) 632, host read command SRAM/FIFO 634, host data SRAM 636, CMB host write buffer 638, controller write buffer 640, host read buffer 644, controller data SRAM 646, controller read buffer 648, and a controller read command SRAM/FIFO 650 which support the functionality of the controller 615, wherein FIFO stands for first-in-first-out buffer.

In some embodiments, the controller 615 includes a PCIe system-on-a-chip (SoC) 601 and host interface circuitry 603. The PCIe SoC 601 may include PCIe IP that facilitates communication by the host interface circuitry 603 with the host system 620 (including a TA 617) using PCIe protocols. Thus, the PCIe SoC 601 may include capability and control registers present for each physical function and each virtual function of the memory sub-system 610. The PCIe SoC 601 may include integrated development environment (IDE) link encryption circuit 605, which encrypts translation layer packets (TLPs) passed over a PCIe bus 611A to a host system 620 and to decrypt TLPs received from the host system 620.

In various embodiments, the host interface circuitry 612 includes the local memory 619 (SRAM, TCM, and the like), a number of host interface circuits 608A, 608B, 608C, ... 608N, an address translation circuit 613 (or ATS) that includes an ATC 616 and translation logic 602, and an AXI matrix 623 employable to send interrupts to a host system 620 in interaction with reference to handling memory commands and DMAs. The host interface circuits 608A-608N, also referred to herein as HIF circuits 608, include hardware components that help to fetch and process commands (for host queues) and data (for DMA) to perform a particular function in command and DMA processing, individual ones of the host interface circuits 608A-608N at times request an address translation of a virtual address or a guest physical address (e.g., associated with a command or DMA). In embodiments, to do so, individual HIF circuits request the address translation circuit 613 to provide the translation. In this way, the address translation circuit 613 interfaces with and supports both address translation generation and invalidation on behalf of the respective host interface circuits 608A-608N, as will be discussed in more detail hereinafter.

The address translation circuit 613 can employ many fields and parameters, such as a smallest translation unit (STU) of data (defined by a particular size typically smaller than a host tag) and an invalidation queue depth, beyond which queue entries are purged. The translation logic 602 may use PCIe memory read TLPs to request a translation for a given untranslated address from the TA 617 (or IOMMU). These address translation requests may carry separate PCIe tags and identifiers, for example. The PCIe tags may include, for example "PCIe Memory read completion," indicating the translated address and the size of translation, "S" bit informing the size of translation (e.g., a translated address may represent contiguous physical address space of 128 KB size or similar size), "R" and "W" bits provide Read/write permissions to a page in physical address space, and "U" bit tells the device to do DMA using the untranslated address only. The U bit may be helpful when buffers are one-time use and TA 617 does not have to send invalidations to the controller 615.

In embodiments, when a translation changes in the TA 617, the ATC 616 (one or more caches) in the memory sub-system 610 should purge the old entries corresponding to a virtual address that has been invalidated. Invalidation requests may be sent by the TA 617 to the address translation circuit 613 using PCIe message TLPs, which requests may be directed at an HIF circuit that is handling some function of memory command processing. The address translation circuit 613 can direct the HIF circuits to purge all DMA for an address range that is being invalidated, remove such entries from the ATC 616, and upon confirmation from the HIF circuits of invalidation, send an invalidation completion (e.g., another PCIe Message TLP) to the host system 620.

In some embodiments, the address translation circuit 613 stores, in the ATC 616, an address translation that returns from the TA 617 in response to an address translation request. In various embodiments, this address translation may include an I/O submission queue (SQ) base address, PRP/SGLs of outstanding commands in one or more HIF circuits, and/or I/O completion queue (CQ) base address. The ATC 616 can be configured to handle finding an empty slot in the ATC 616 and storing a new translation in the empty slot, looking up when data TLPs show up, and purging entries during function level reset (FLR), invalidations, and other resets. The ATC 616 can further be configured to age-out older entries to make space when the cache is running full.

In various embodiments, a queue portion 416A of the ATC 616 cache can be sized to include at least one or two entries per queue of the SQs 442, CQs 444, I/O queues 446, and admin queues 448, although more are envisioned as cache memory device sizes and costs decrease. With sufficient space for two entries, the ATC 616 can store the address translation of a current page associated with a queue as well as a next page (e.g., that sequentially follows the virtual address of the current page). This look-ahead buffering in the ATC 616 of address translations for a predetermined number of queues enables greatly reducing the number of misses at the ATC while keeping a size of the ATC reasonable given the expense of cache memory. Further, a DMA portion 416B of the ATC 616 (for storing data for DMAs) could be expanded for some integral multiple (e.g., 2-4 times) the size of the queue portion of the ATC 616.

In at least some embodiments, the translation logic assigns a queue identifier to each queue of the SQs 442, CQs 444, I/O queues 446, and admin queues 448 ("the queues"). This could be as simple as sequentially incrementing a count number for each subsequent sequentially-ordered queue of a set of queues. The translation logic 602 may then index the queue portion 416A of the ATC 616 cache according to the queue identifier of the respective address translation stored therein and internally (within the address translation circuit 613) track address translation requests and responses using such queue identifiers. Further, the translation logic 602 may index the DMA portion 416B of the cache according to host tag value and internally track DMA-related address translations requests and responses using hot tag values.

In these embodiments, each DMA command has a host tag ("htag") with a virtual address. The translation logic 602 may be configured to store in the ATC 616 one translation per htag for data if the data is more than or equal to a pre-configured size of data. The translation logic 602 may further be configured to store in the ATC 616 one translation per htag for metadata (with no size limit dictating whether to cache). During further operation of the controller 615, the address translation is used as long as subsequent TUs (within the htag) use the same translated physical address range. The cached translation gets replaced when the DMA command starts transferring to or from a different memory range. The cached address translation also gets replaced when the htag gets assigned to a different command, e.g., that uses a different memory location.

Figure 7:
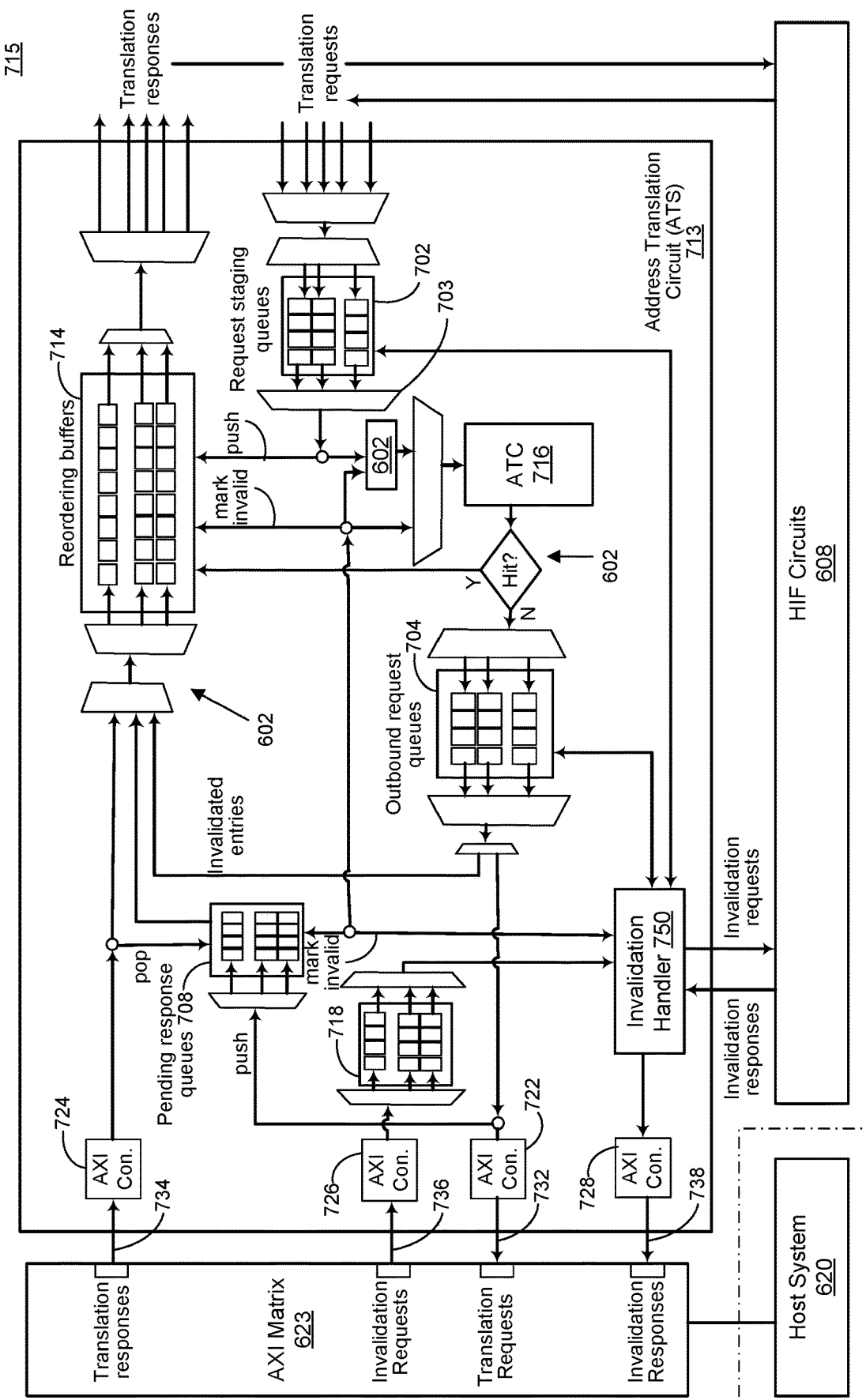
FIG. 7 is an example memory sub-system controller including an address translation circuit implementing caching host memory address translation data in accordance with some embodiments.

FIG. 7 is an example memory sub-system controller 715 including an address translation circuit 713 (or ATS) implementing caching host memory address translation data in accordance with some embodiments. The address translation circuit 713 may be a more detailed instantiation of the address translation circuit 113, 213, 413, and/or 613 discussed with reference to FIG. 1, FIG. 2, FIG. 4, and FIG. 6, respectively.

In various embodiments, the address translation circuit 713 includes a pipeline of queues, buffers, and multiplexers that facilitate the flow of address translation requests and responses and that interfaces with an address translation cache (ATC) 716, similarly as introduced and discussed previously. The multiplexers are generally included within the translation logic 602 and are therefore not always individually numbered or discussed separately from the translation logic 602.

In embodiments, this pipeline begins with address translation requests flowing into a set of request staging queues 702 from host interface (HIF) circuits 608 (see FIG. 6). These address translation requests are often received as a series of address translation requests from any given HIF circuit 608, thus each queue in the set of request staging queues 702 includes multiple available entries for multiple virtual addresses associated with an incoming series of address translation requests, which can be received as a group for example from a given HIF circuit 608. The set of request staging queues 702 buffer the address translation requests, each including a virtual address, which are received from a host interface circuit. A multiplexer 703 then pushes each address translation request into both a set of reordering buffers 714 and to the translation logic 602 that was initially discussed with reference to FIG. 6. Within the set of reordering buffers 714, the address translation requests will provide initial entries that will later be completed with address translations, which will be provided in response to corresponding requesting HIF circuits 608. In embodiments, the translation logic 602 is configured to store incoming address translations, e.g., from the set of reordering buffers 714, into the ATC 716.

In embodiments, the translation logic 602 is coupled to the set of request staging queues 702, the set of reordering buffers 714, and the ATC 716, among other components. The translation logic 602 can determine a queue identifier for respective queues of multiple submission queues (SQs) and multiple completion queues (CQs) discussed previously and identify the queue identifier for respective address translation requests. The translation logic 602 can further index the queue portion 416A of the cache according to the queue identifier of the respective address translations requests.

In at least some embodiments, the translation logic 602 is configured to, for each address translation request in the set of request staging queues, store, in the ATC 716, a first address translation corresponding to a current page associated with the address translation request and store, in the ATC 716, a second address translation corresponding to a subsequent page that sequentially follows the current page according to virtual address numbering. This look-ahead buffering in the ATC 716 of address translations for a predetermined number of queues enables greatly reducing the number of misses at the ATC 716 while keeping a size of the ATC reasonable given the expense of cache memory. As cost of cache memory decreases, it is envisioned that one or more additional address translations that sequentially follow the first address translation (according to virtual addresses) can also be stored in the ATC 716.

In some embodiments, for incoming DMA requests, the translation logic 602 can identify a first host tag, within at least some of the address translation requests, associated with data for DMA. The translation logic can further identify a second host tag, within the at least some of the address translation requests, associated with metadata of the data. The translation logic can then index the DMA portion 416B of the cache according to host tag value, to include values corresponding to each first host tag and each second host tag. In embodiments, in response to a translation unit (TU) of a subsequent address translation request being within a translated memory range as a cached host tag, the translation logic uses an address translation of the cached host tag in the ATC 716 to satisfy the subsequent address translation request. Further, in response to the subsequent address translation request targeting a different memory range than the translated memory range, the translation logic can evict the address translation from the ATC 716. In response to the cached host tag being assigned to a different command, the translation logic 602 can also evict the address translation from the cache (ATC 716).

In some embodiments, the translation logic 602 further, for each incoming address translation request, determines whether the virtual address (or queue identifier) within the address translation request hits or misses at the cache (ATC 716). If the virtual address has a hit within the cache, the translation logic 602 may reinsert a corresponding address translation (including the mapped physical address) into the reordering buffers 714 to be provided out to the requesting HIF circuit 608. Thus, address translations that hit at the ATC 716 can be provided back to the requesting HIF circuit 608 at close to line rate without any further delay in requesting the TA/IOMMU at the host system 620 to perform the translation.

In embodiments, the address translation circuit 713 further includes a set of outbound request queues 704 to buffer one or more of the address translation requests that miss at the cache (the ATC 716), e.g., as an extra pipeline stage for staging these address translation requests to be sent to the host system 620. As these address translation requests are forwarded on to the host system 620, the translation logic 602 pushes each address translation request into a set of pending response queues 708. In embodiments, the set of pending response queues 708 is configured to buffer respective address translation requests that are waiting for an address translation from the host system 620 while maintaining an order as received within the set of request staging queues 702. Maintaining this order within the set of pending response queues 708 helps the set of reordering buffers 714 to properly reorder address translations that come back from the host system 620 (e.g., the TA 617 or IOMMU) despite being pushed out of the set of request staging queues 702 while waiting on the TA 617.

In these embodiments, the address translation requests that missed at the ATC 716 are forwarded to an AXI converter 722, which sends out address translation requests to the host interface 208 over a set of address channels for reads 732 and destined to the TA 617. In this way, the address translation circuit 713 can request a translation agent (such as the TA 617) of the host system to provide physical addresses that map to a first virtual address of the first address translation (for the current page) and to a second virtual address of the second address translation (for the subsequent page that sequentially follows the current page according to virtual address numbering). In response to the TA 617 providing the address translations, the address translations are received over a set of data channels 734 for reads and through an AXI converter 724.

In disclosed embodiments, the translation logic 602 pops the incoming address translations into the set of pending responses queues 708 while also storing the address translations (e.g., the first address translation and the second address translation) in the set of reordering buffers 714. The set of reordering buffers 714 have also received, from the set of pending response queues 708, the proper order of the address translations in relation to the order of receipt of the address translation requests in the set of request staging queues 702. As mentioned, this may include a series of address translation requests from the same HIF circuit 608, and thus the set of reordering buffers 714 can be configured to reorder each pair of address translations for each of these address translation requests to match the order the address translation requests were buffered into the set of pending response queues 708. Thus, the set of reordering buffers 714 can reorder the address translations in this way and provide the first address translation (for each address translation request) to the requesting HIF circuit 608 in the same order as was received with the exception of those that hit at the ATC 716 and have already been supplied to the requesting HIF circuit 608. In these embodiments, the translation logic 602 detects the incoming address translations and copies them from the set of reordering buffers into the ATC 716, which can be accessed later for matches with subsequent address translation requests.

In some embodiments, a translation completion response may come back as a "miss" from the host system 620 because the page corresponding to the virtual address has been unmapped. The translation logic 602 can then reply to the requesting HIF circuit 608 that the virtual address of a particular address translation requested missed. In response to receiving a TLP of such a miss, the HIF circuit 608 may be triggered to generate a page request interface (PRI) message to the host system 620 to remap the virtual address to a physical page having a physical address.

In at least some embodiments, the address translation circuit 713 further includes a set of invalidation queues 718 to buffer invalidation requests received from a translation agent of the host system. More specifically, the invalidation requests may be received over a set of data channels for writes 736 into an AXI converter 726 that receives the invalidation requests from the host system 620. The translation logic 602 can then place each incoming invalidation request into the set of invalidation queues 718 to be handled in an order received.

In these embodiments, the address translation circuit 713 further includes invalidation handler logic 750 coupled to the set of invalidation queues 718, to the host interface circuits 608, to the set of request staging queues 702, to the set of pending response queues 708, and to the set of reordering buffers 714. In embodiments, the invalidation handler logic 750 detects an invalidation request within the set of invalidation queue 718, the invalidation request corresponding to a virtual address of the virtual addresses. The invalidation handler logic 750 can further cause address translations associated with the virtual address to be marked as invalid within the set of request staging queues 702, the set of pending response queues 704, the set of reordering buffers 714, and the cache (the ATC 716). In embodiments, the set of outbound request queues 704 triggers (e.g., via the translation logic 602) the set of reordering buffers 714 to mark an entry therein as invalid in response to an invalidation signal received from the invalidation handler logic 750. The invalidation handler logic 750 can further send associated invalidation requests to the respective host interface circuits 608, which also would be expected to purge invalid entries.

In some embodiments, the address translation circuit 713 (e.g., the corresponding queues and buffers) remove address translations marked as invalid within the set of request staging queues 702, the set of pending response queues 704, the set of reordering buffers 714, and the cache (ATC 716). Each HIF circuit 608 can send an invalidation complete message to the address translation circuit 713, to which the invalidation handler logic 750 and reply with an acknowledgement (ACK). In this way, invalidation handler logic 750 can confirm removal of the address translations by the host interface circuits 608 followed by sending an invalidation completion response to the translation agent (TA 617). The ACK responses may be used by individual HIF circuits 608 to unfreeze any frozen function arbitration.

More specifically, when the invalidation handler logic 750 has confirmed the address translation circuit 713 and the HIF circuits 608 have purged queue, buffer, and cache entries of invalid address translations associated with an invalidation requests, the invalidation handler logic 750 may send an invalidation response to an AXI converter 728. The AXI converter 728 can place the invalidation response out on a set of data channels for writes 738 to the TA 617 at the host system 620 and destined.

FIG. 8 is a flow chart of an example method 800 of caching host memory address translation data in a memory sub-system in accordance with some embodiments of the present disclosure. The method 800 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 800 is performed by the address translation circuit 113, 213, 413, 613, 713 of FIG. 1, FIG. 2, FIG. 4, FIG. 6, and FIG. 7, respectively. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 810, the processing logic buffers, within a set of request staging queues of an address translation circuit, address translation requests received from host interface circuits and each comprising a virtual address.

At operation 820, the processing logic stores, within a set of pending response queues, respective address translation requests that are waiting for an address translation from a host system while maintaining an order as received within the set of request staging queues.

At operation 830, the processing logic reorders, within a set of reordering buffers, address translations according to the order maintained within the set of pending response queues, wherein each address translation comprises a physical address mapped to a respective virtual address.

At operation 840, the processing logic sends, from the reordering buffers, the address translations to a corresponding host interface circuit of the host interface circuits that sent a corresponding address translation request.

At operation 850, the processing logic stores, in a cache coupled with the set of request staging queues and the set of reordering buffers, a plurality of the address translations, associated with the address translations requests, for future access by the host interface circuits. Also, at operation 850, the processing logic can further store a plurality of pointers (e.g., SGS/SGL pointers) for outstanding direct memory address (DMA) command within on or more host interface circuits.

At operation 860, when applicable, the processing logic reinserts, into the set of reordering buffers, a first address translation from the cache for a subsequent request for the first address translation by a host interface circuit.

Figure 9:
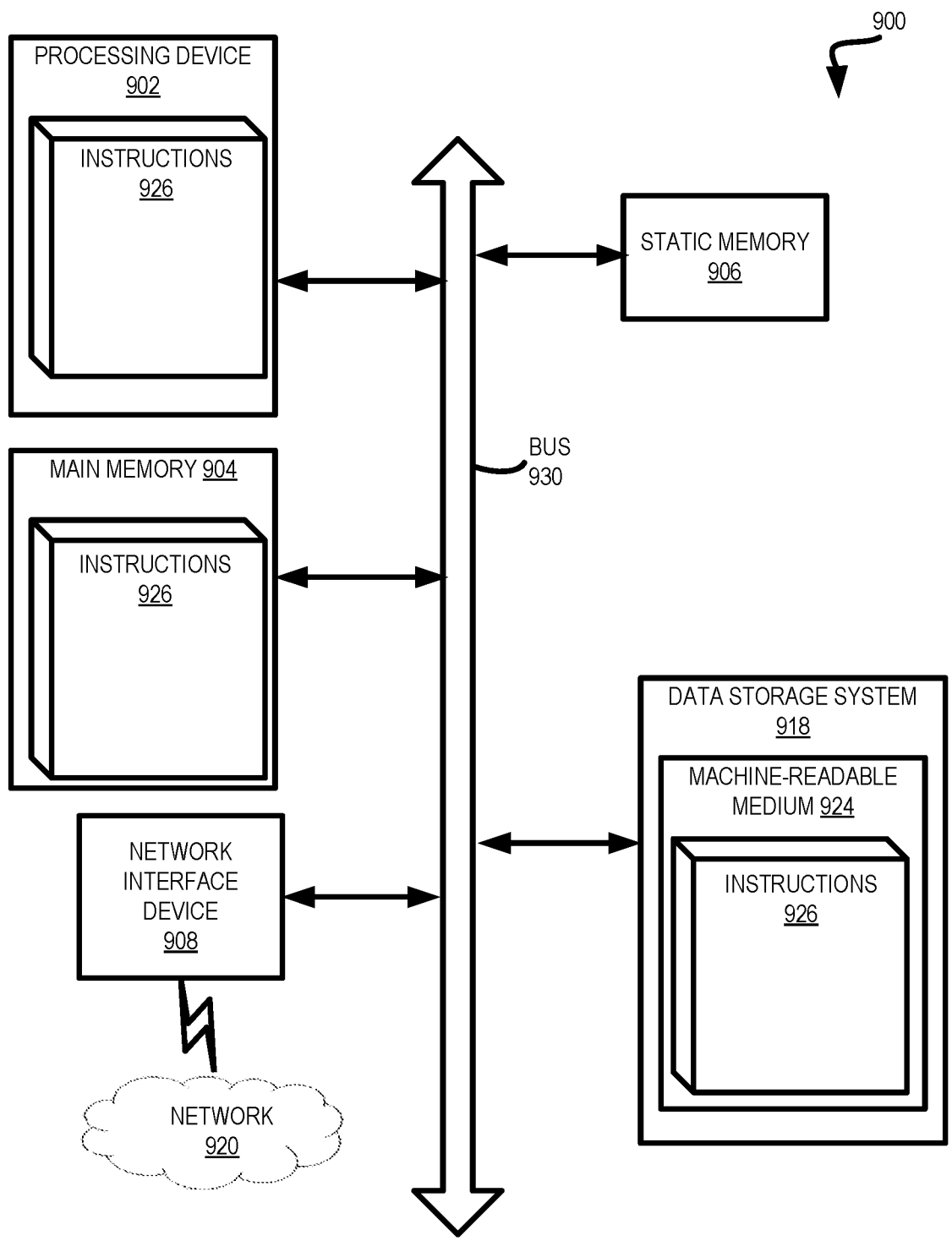
FIG. 9 is a block diagram of an example computer system in which embodiments of the present disclosure can operate.

FIG. 9 illustrates an example machine of a computer system 900 within which a set of instructions, for causing the machine to perform any one or more of the methodologies discussed herein, can be executed. In some embodiments, the computer system 900 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute instructions or firmware of the controller 115). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM) or Rambus DRAM (RDRAM), etc.), a static memory 906 (e.g., flash memory, static random access memory (SRAM), etc.), and a data storage system 918, which communicate with each other via a bus 930.

Processing device 902 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 902 can also be one or more special-purpose processing devices such as an application specific integrated circuit (ASIC), a field programmable gate array (FPGA), a digital signal processor (DSP), network processor, or the like. The processing device 902 is configured to execute instructions 926 for performing the operations and steps discussed herein. The computer system 900 can further include a network interface device 908 to communicate over the network 920.

The data storage system 918 can include a machine-readable storage medium 924 (also known as a computer-readable medium) on which is stored one or more sets of instructions 926 or software embodying any one or more of the methodologies or functions described herein. The instructions 926 can also reside, completely or at least partially, within the main memory 904 and/or within the processing device 902 during execution thereof by the computer system 900, the main memory 904 and the processing device 902 also constituting machine-readable storage media. The machine-readable storage medium 924, data storage system 918, and/or main memory 904 can correspond to the memory sub-system 110 of FIG. 1.

In one embodiment, the instructions 926 include instructions to implement functionality corresponding to the controller 115 of FIG. 1. While the machine-readable storage medium 924 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
host interface circuitry comprising a plurality of host interface circuits to interact with a host system; and
an address translation circuit of the host interface circuitry to handle address translation requests to the host system from the plurality of host interface circuits, the address translation circuit comprising:
a set of request staging queues to buffer the address translation requests, each address translation request comprising a virtual address and received from a host interface circuit of the plurality of host interface circuits;
a set of pending response queues to buffer respective address translation requests that are waiting for an address translation from the host system while maintaining an order as received within the set of request staging queues;
a set of reordering buffers to reorder address translations, which are to be supplied to the plurality of host interface circuits, according to the order of the received address translation requests maintained within the set of pending response queues, wherein each address translation comprises a physical address mapped to a respective virtual address; and
a cache coupled to the set of request staging queues and to the set of reordering buffers, wherein the cache is to store a plurality of the address translations, associated with the address translation requests, for future access by the plurality of host interface circuits.

2. The system of claim 1, further comprising translation logic coupled to the set of request staging queues, the set of reordering buffers, and the cache, the translation logic to:
store, in the cache, the plurality of the address translations and a plurality of pointers for outstanding direct memory address (DMA) commands within one or more host interface circuits; and
reinsert, into the set of reordering buffers, a first address translation from the cache for a subsequent request for the first address translation by a host interface circuit.

3. The system of claim 1, further comprising:
memory to store a plurality of submission queues and a plurality of completion queues, wherein memory commands queued in the plurality of submission queues are ordered sequentially according to virtual addresses of the memory commands, and wherein completions queued in the plurality of completion queues are ordered sequentially according to virtual addresses of the completions corresponding to the memory commands queued in the plurality of submission queues; and
translation logic coupled to the set of request staging queues, the set of reordering buffers, and the cache, the translation logic to:
determine a queue identifier for respective queues of the plurality of submission queues and the plurality of completion queues;
identify the queue identifier for respective address translation requests; and
index a queue portion of the cache according to the queue identifier of the respective address translations requests.

4. The system of claim 1, further comprising translation logic coupled to the set of request staging queues, the set of reordering buffers, and the cache, the translation logic to:
identify a first host tag, within the address translation requests, associated with data for direct memory access (DMA);
identify a second host tag, within the address translation requests, associated with metadata of the data; and index a DMA portion of the cache according to host tag values, to include values corresponding to the first host tag and the second host tag.

5. The system of claim 4, wherein the translation logic is further to:
in response to a translation unit of a subsequent address translation request being within a translated memory range as a cached host tag, use an address translation of the cached host tag in the cache to satisfy the subsequent address translation request;
in response to the translation unit of a subsequent address translation request targeting a different memory range than the translated memory range, evict the translation unit from the cache; and
in response to the cached host tag being assigned to a different command, evict the translation unit from the cache.

6. The system of claim 1, further comprising translation logic coupled to the set of request staging queues, the set of reordering buffers, and the cache, the translation logic to, for a first address translation request in the set of request staging queues:
store, in the cache, a first address translation corresponding to a current page associated with the first address translation request; and
store, in the cache, a second address translation corresponding to a subsequent page that sequentially follows the current page according to virtual address numbering.

7. The system of claim 6, wherein the translation logic is to store the first address translation and the second address translation in the cache and is further to:
detect a miss at the cache for the virtual address of the first address translation request in the set of request staging queues;
request a translation agent of the host system to provide physical addresses that map to a first virtual address of the first address translation and to a second virtual address of the second address translation;
receive the physical addresses from the host system within the first address translation and the second address translation; and
store the first address translation and the second address translation in the set of reordering buffers to be reordered and to be stored in the cache.

8. The system of claim 1, wherein the address translation circuit further comprises a set of outbound request queues to:
buffer one or more address translation requests that miss at the cache; and
trigger the set of reordering buffers to mark an entry therein as invalid in response to an invalidation request for a corresponding address translation request.

9. The system of claim 1, wherein the address translation circuit further comprises:
a set of invalidation queues to buffer invalidation requests received from a translation agent of the host system; and
invalidation handler logic coupled to the set of invalidation queues, to the plurality of host interface circuits, to the set of request staging queues, to the set of pending response queues, and to the set of reordering buffers, the invalidation handler logic to:
detect an invalidation request within the set of invalidation queues, the invalidation request corresponding to the virtual address of a first address translation request buffered in the set of request staging queues;
cause address translations for the first address translation request to be marked as invalid within the set of request staging queues, the set of pending response queues, the set of reordering buffers, and the cache; and
send associated invalidation requests to the plurality of host interface circuits.

10. The system of claim 9, wherein the address translation circuit is to:
remove the address translations marked as invalid within the set of request staging queues, the set of pending response queues, the set of reordering buffers, and the cache;
receive, from the plurality of host interface circuits in response to the associated invalidation requests, a confirmation of invalidation of the address translations marked as invalid; and
send an invalidation completion response to the translation agent.

11. A method comprising:
buffering, within a set of request staging queues of an address translation circuit, address translation requests received from host interface circuits, wherein each address translation request comprises a virtual address;
storing, within a set of pending response queues, respective address translation requests that are waiting for an address translation from a host system while maintaining an order as received within the set of request staging queues;
reordering, within a set of reordering buffers, address translations according to the order of the address translation requests maintained within the set of pending response queues, wherein each address translation comprises a physical address mapped to a respective virtual address;
sending, from the set of reordering buffers, each of the address translations to a corresponding host interface circuit of the host interface circuits that sent a corresponding address translation request; and
storing, in a cache coupled with the set of request staging queues and the set of reordering buffers, a plurality of the address translations, associated with the address translations requests, for future access by the host interface circuits.

12. The method of claim 11, further comprising reinserting, into the set of reordering buffers, a first address translation from the cache for a future access to the first address translation by a host interface circuit of the host interface circuits.

13. The method of claim 11, further comprising:
determining a queue identifier for respective queues of a plurality of submission queues and a plurality of completion queues, wherein memory commands queued in the plurality of submission queues and in the plurality of completion queues are ordered sequentially according to virtual addresses of the memory commands;
identifying the queue identifier for respective address translation requests; and
indexing a queue portion of the cache according to the queue identifier of the respective address translations requests.

14. The method of claim 11, further comprising:
identifying a first host tag, within the address translation requests, associated with data for direct memory access (DMA);

identifying a second host tag, within the address translation requests, associated with metadata of the data; and
indexing a DMA portion of the cache according to host tag values, to include values corresponding to the first host tag and the second host tag.

15. The method of claim 14, further comprising:
in response to a translation unit of a subsequent address translation request being within a translated memory range as a cached host tag, using an address translation of the cached host tag in the cache to satisfy the subsequent address translation request;
in response to the translation unit of the subsequent address translation request targeting a different memory range than the translated memory range, evicting the translation unit from the cache; and
in response to the cached host tag being assigned to a different command, evicting the translation unit from the cache.

16. The method of claim 11, further comprising for a first address translation request in the set of request staging queues:
storing, in the cache, a first address translation corresponding to a current page associated with the first address translation request; and
storing, in the cache, a second address translation corresponding to a subsequent page that sequentially follows the current page according to virtual address numbering.

17. The method of claim 16, wherein performing storing the first address translation and storing the second address translation in the cache further comprise:
detecting a miss at the cache for the virtual address of the first address translation request in the set of request staging queues;
requesting a translation agent of the host system to provide physical addresses that map to a first virtual address of the first address translation and to a second virtual address of the second address translation;
receiving the physical addresses from the host system within the first address translation and the second address translation; and
storing the first address translation and the second address translation in the set of reordering buffers to be reordered and to be stored in the cache.

18. The method of claim 11, further comprising:
buffering, in a set of outbound request queues, one or more address translation requests that miss at the cache; and
triggering the set of reordering buffers to mark an entry therein as invalid in response to an invalidation request for a corresponding address translation request.

19. The method of claim 11, further comprising:
buffering, within a set of invalidation queues of the address translation circuit, invalidation requests received from a translation circuit of a host system;
detecting an invalidation request within the set of invalidation queues, the invalidation request corresponding to the virtual address of a first address translation request buffered in the set of request staging queues;
causing address translations for the first address translation request to be marked as invalid within the set of request staging queues, the set of pending response queues, the set of reordering buffers, the cache; and
sending associated invalidation requests to the host interface circuits.

20. The method of claim 19, further comprising:
removing the address translations marked as invalid within the set of request staging queues, the set of pending response queues, the set of reordering buffers, and the cache;
receiving, from the host interface circuits in response to the associated invalidation requests, a confirmation of invalidation of the address translations marked as invalid; and
sending an invalidation completion response to the translation circuit.

21. A system comprising:
host interface circuitry comprising a plurality of host interface circuits to interact with a host system; and
an address translation circuit of the host interface circuitry to handle address translation requests from the plurality of host interface circuits, the address translation circuit comprising:
a set of request staging queues to buffer the address translation requests, each address translation request comprising a virtual address and received from one of the plurality of host interface circuits;
a set of reordering buffers to reorder address translations, which are to be supplied to the plurality of host interface circuits, according to an order of corresponding address translation requests received within the set of request staging queues;
a cache coupled to the set of reordering buffers; and
translation logic coupled to the set of request staging queues, the set of reordering buffers, and the cache, the translation logic to:
store, in the cache, a plurality of the address translations associated with the address translation requests; and
reinsert, into the set of reordering buffers, a first address translation from the cache for a subsequent request for the first address translation by a host interface circuit of the plurality of host interface circuits.

* * * * *